US012332690B2

(12) United States Patent
Rose et al.

(10) Patent No.: US 12,332,690 B2
(45) Date of Patent: Jun. 17, 2025

(54) COMPUTING SYSTEM

(71) Applicant: LENOVO (SINGAPORE) PTE. LTD, Singapore (SG)

(72) Inventors: Alden Rose, Morrisville, NC (US); Ghwang Hyun Lim, Morrisville, NC (US); Ali Ent, Morrisville, NC (US); Jeffrey E. Skinner, Morrisville, NC (US); Jung Hwan Hong, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/849,610

(22) Filed: Jun. 25, 2022

(65) Prior Publication Data
US 2024/0053797 A1 Feb. 15, 2024

(51) Int. Cl.
| | | |
|---|---|---|
| G06F 1/16 | (2006.01) | |
| G06F 3/01 | (2006.01) | |
| G06F 3/0346 | (2013.01) | |
| G06F 3/14 | (2006.01) | |
| H04M 1/724 | (2021.01) | |

(52) U.S. Cl.
CPC .......... G06F 1/1632 (2013.01); G06F 1/1681 (2013.01); G06F 3/017 (2013.01); G06F 3/0346 (2013.01); G06F 3/1454 (2013.01); H04M 1/724 (2021.01)

(58) Field of Classification Search
CPC ...... G06F 1/1632; G06F 1/1681; G06F 3/017; G06F 3/0346; G06F 3/1454; G06F 1/16; G06F 3/0488; G06F 3/044; H04M 1/724
See application file for complete search history.

(56) References Cited

U.S. PATENT DOCUMENTS

| | | | | |
|---|---|---|---|---|
| 2014/0355189 A1* | 12/2014 | Nakano | ................ | G06F 1/1632 361/679.11 |
| 2015/0092329 A1* | 4/2015 | Balasundaram | ........ | G06F 1/165 361/679.09 |
| 2015/0227739 A1* | 8/2015 | Russello | ................ | G06F 1/1647 726/19 |
| 2015/0268699 A1* | 9/2015 | Bathiche | ................ | G06F 1/1649 345/1.3 |
| 2022/0103675 A1* | 3/2022 | Hulbert | ............ | G06Q 20/40145 |
| 2022/0236764 A1* | 7/2022 | Nyholm | ................ | G06F 1/1628 |

* cited by examiner

*Primary Examiner* — Michael A Faragalla
(74) *Attorney, Agent, or Firm* — Brian J. Pangrle

(57) ABSTRACT

A system can include a processor; memory accessible to the processor; a base housing; a display housing that includes a display operatively coupled to the processor, a display side, and a back side that includes a back side mobile device docking surface; a hinge assembly that couples the display housing and the base housing; and mobile device control circuitry that, responsive to docking of a mobile device to the back side mobile device docking surface, issues a mobile device operational control command.

20 Claims, 9 Drawing Sheets

Method 610

COMPUTING SYSTEM

TECHNICAL FIELD

Subject matter disclosed herein generally relates to technology for computing systems or other systems.

BACKGROUND

A computing system can be a clamshell system that can fold and open and can include, for example, a base housing and a display housing, or, for example, a folding housing that defines two housing portions.

SUMMARY

A system can include a processor; memory accessible to the processor; a base housing; a display housing that includes a display operatively coupled to the processor, a display side, and a back side that includes a back side mobile device docking surface; a hinge assembly that couples the display housing and the base housing; and mobile device control circuitry that, responsive to docking of a mobile device to the back side mobile device docking surface, issues a mobile device operational control command. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
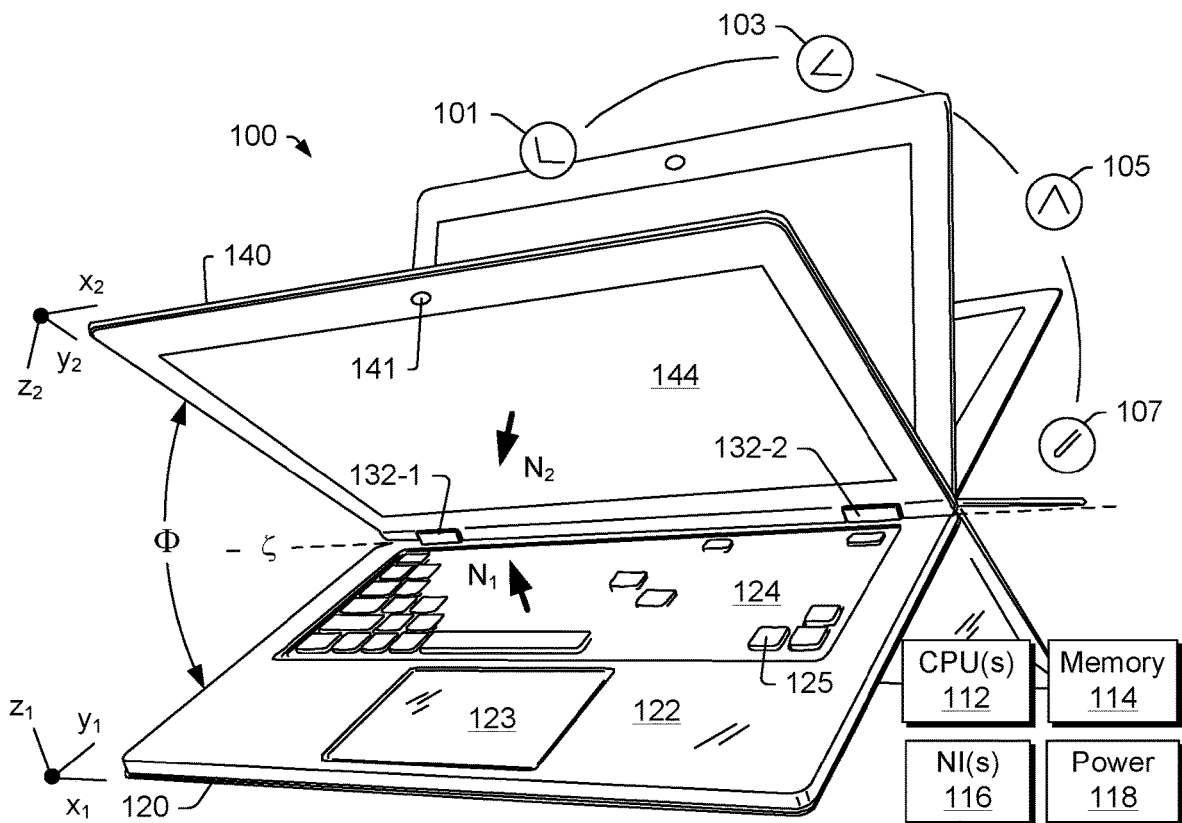
FIG. 1 is a diagram of an example of a computing device.
Figure 1:
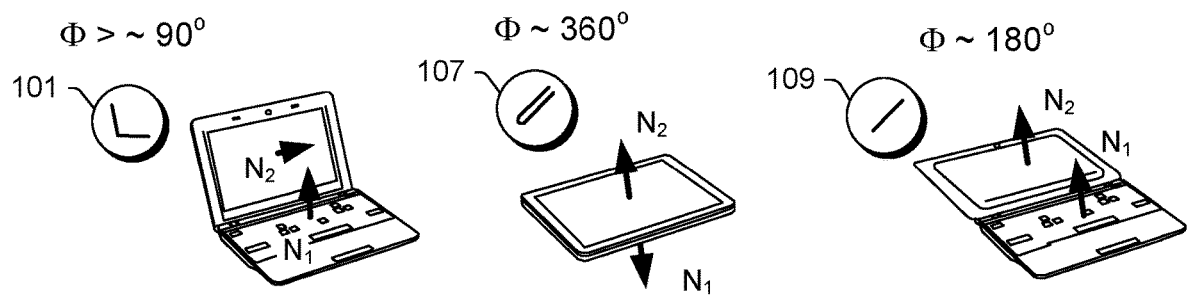

FIG. 1 shows an example of a computing device 100 (e.g., a computing system) that includes a keyboard housing 120 and a display housing 140 that are pivotable with respect to each other via movement about one or more hinges 132-1 and 132-2 (e.g., hinge assemblies). The computing device 100 may be a system such as, for example, a computing system (e.g., an information handling device, etc.).

As an example, the computing device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 and can include a camera 141 mounted in a bezel region of a bezel that surrounds the display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the computing device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the computing device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the computing device 100, the keys 125 may be contacted by the users hand or hands. A user may perceive the springiness of the keys 125 as being somewhat undesirable. For example, springy keys may interfere with a user's ability to comprehend or sense force that is sufficient to grasp the computing device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the computing device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
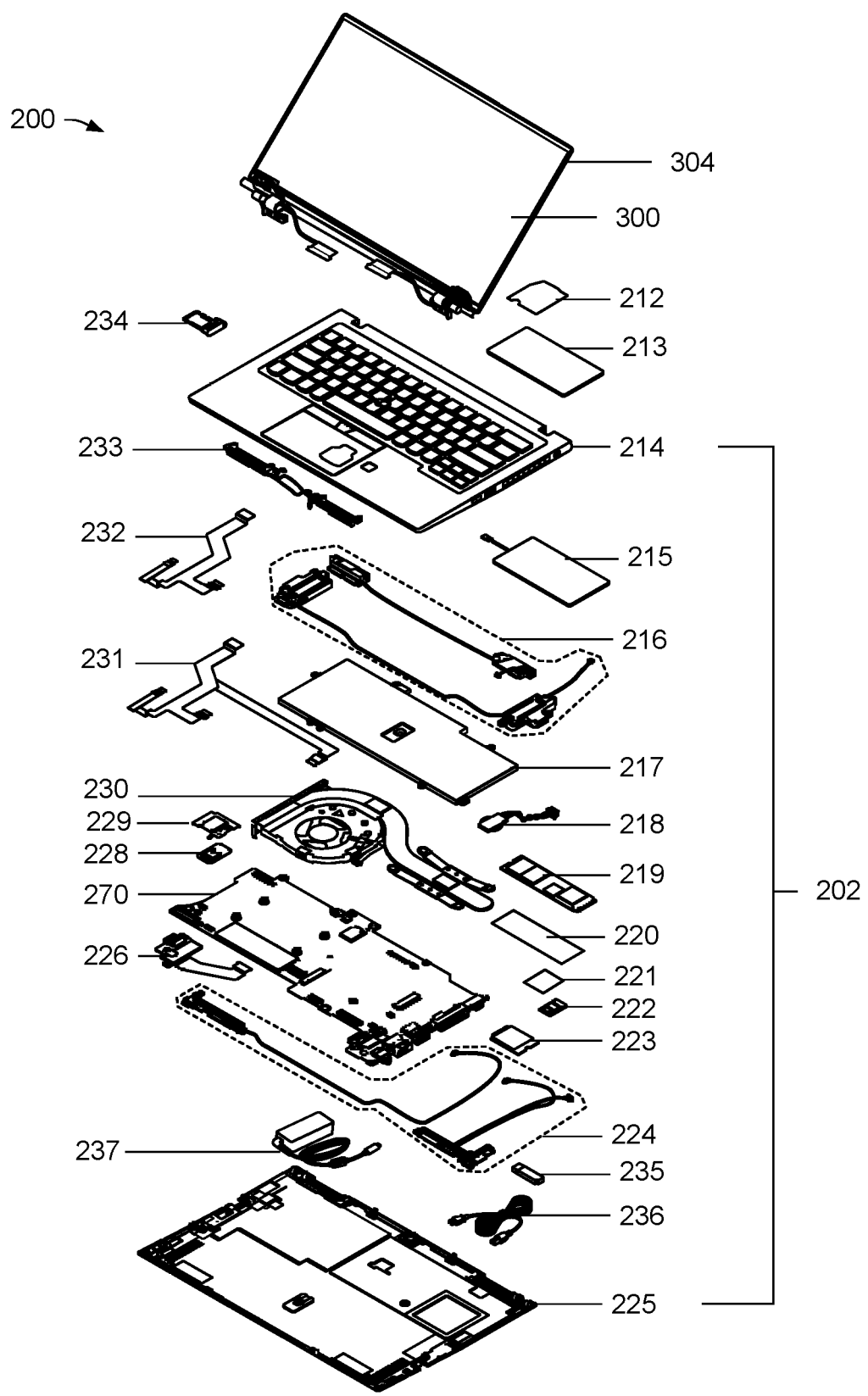
FIG. 2 is a diagram of an example of a computing device or computing system.

FIG. 2 shows an exploded perspective view of a computing device 200 as including various components, which can include, for example, a display assembly 300, a housing 304 (e.g., a display housing), insulation trackpad tape 212, a trackpad 213 or 215, a keyboard bezel assembly with a keyboard 214, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, and an AC power adapter 237. The computing device 200 may be referred to as a computing system that can include various components, circuitry, etc. (see, e.g., FIG. 9).

In the example of FIG. 2, various components can form a housing 202, which may be referred to as a base housing and/or a keyboard housing, where the housing 202 may be coupled to the housing 304 via one or more hinge assemblies, etc. For example, the computing device 200 can include a first housing 202 coupled to a second housing 304 via one or more hinge assemblies (see, e.g., one or more hinge assemblies 326 of FIG. 3, etc.).

Figure 3:
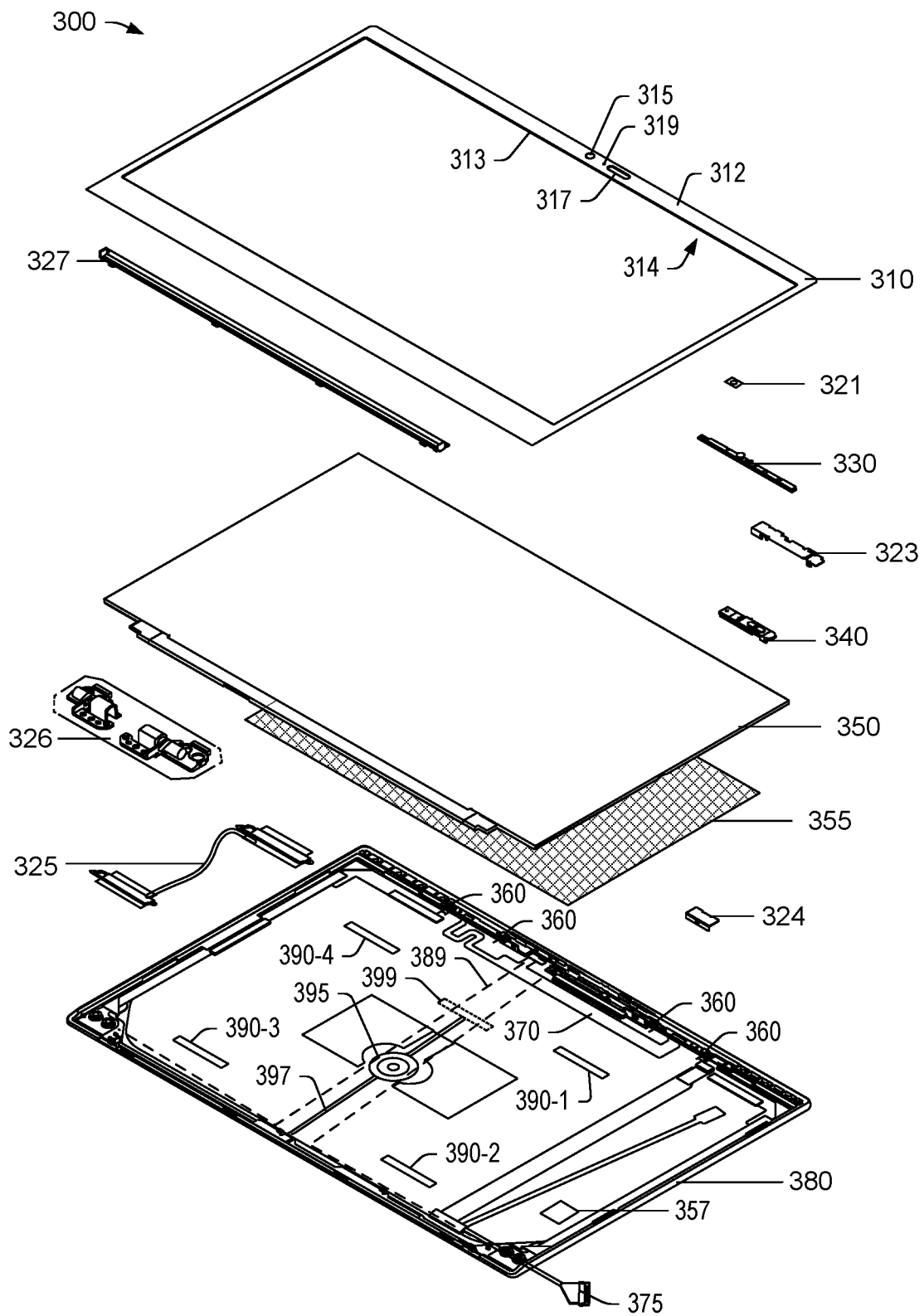
FIG. 3 is a diagram of an example of a display assembly of the computing device or computing system of FIG. 2.

FIG. 3 shows an exploded perspective view of the display assembly 300 of FIG. 2 as including various components, which can include, for example, a bezel 310, a foam component for an IR LED camera 321, a camera assembly 330, a stopper 323, a shutter 340, a display panel 350, an orientation sensor 357 (e.g., an accelerometer, gyroscope, etc.), a support plate 324, one or more microphones 360, wiring 370, one or more wiring connectors 375, a back side (rear) cover assembly 380, a display cable 325, one or more hinge assemblies 326, and a display bezel frame component 327.

In the example of FIG. 2 and FIG. 3, the computing device 200 can include various media capture components. For example, a camera can be a media capture component, a microphone can be a media capture component, etc. A media capture component may be an audio media capture component, a video media capture component, a still image media capture component, etc.

As shown, the bezel 310 includes a front surface 312 and an opposing rear surface 314 where various openings extend between the front surface 312 and the rear surface 314. For example, as shown, the bezel 310 includes a display opening 313, a camera opening 315, a shutter control opening 317, and an IR camera opening (e.g., where an IR camera is included, noting that a camera may be a combined visible and IR camera).

As shown, the camera assembly 330 couples to the back side cover assembly 380 where the wiring 370 operatively couples to the camera assembly 330 and to the one or more microphones 360. The display assembly 300 can be operatively coupled to other circuitry of the computing device 200, for example, via the one or more wiring connectors 375.

In the example of FIG. 3, the display assembly 300 may include one or more rigid support members 389, which may, for example, extend between one or more of the one or more hinge assemblies 326 and upward toward the camera assembly 330. In such an example, force may be carried by the one or more rigid support members 389 in a manner that may reduce risk of distorting the display panel 350. As an example, the one or more rigid support members 389 may help to more evenly distribute force with respect to a hinge assembly or hinge assemblies such that risk of twisting a display panel (e.g., out of a plane) is reduced.

In the example of FIG. 3, the display assembly 300 can include magnets 390-1, 390-2, 390-3 and 390-4 that can generate a magnetic attraction force to couple a display device to the back side cover assembly 380. As an example, the display assembly 300 can include a wireless interface 395, which can include one or more antennas and/or a wired interface 399, which can be an outwardly facing electrical contact interface. In such an approach, the wireless interface 395 and/or the wired interface 399 can be coupled to circuitry 397, which may provide for interactions with circuitry of the housing 202. As an example, the display assembly 300 may include an optical interface that can transmit data, for example, to provide for interactions with circuitry of the housing 202. In the example of FIG. 3, the display assembly 300 may include one or more shields 355 that can act to shield one or more components from electrical and/or magnetic fields. For example, the one or more shields 355 can include a Faraday shield that can help to reduce fields associated with circuitry and/or can include a high magnetic permeability metal alloy (e.g., permalloy, mu-metal, nanocrystalline grain structure ferromagnetic metal coating, etc.), which can draw a field into themselves, providing a path for magnetic field lines around a shielded region. As an example, each of the magnets 390-1, 390-2, 390-3 and 390-4 may have an associated shield or shields and, for example, the wireless interface 395 may have an associated shield. As an example, a magnet can be a permanent magnet, an electromagnet or an electropermanent magnet. As an example, one or more types of magnets may be utilized. As an example, circuitry can be included to control a magnetic field of an electromagnet and/or an electropermanent magnet.

Figure 4:
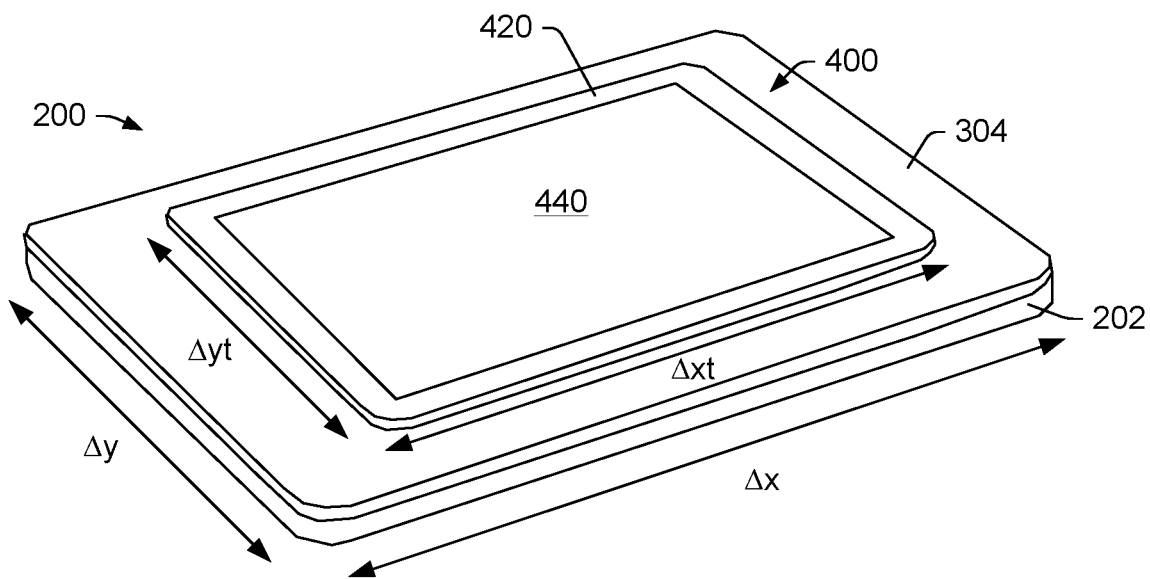
FIG. 4 is a diagram of an example of the computing device or computing system of FIG. 2 coupled to an example of a mobile device.

FIG. 4 shows an example of the computing device 200 with a mobile device 400 where the mobile device 400 is coupled to the computing device 200 such that the two devices 200 and 400 can be transported as a unit. For example, the mobile device 400 can be coupled via magnetic attraction force to the computing device 200 where either or both of the devices 200 and 400 can include magnets. As an example, the computing device 200 can include the magnets 390-1, 390-2, 390-3 and 390-4 and the mobile device 400 can include ferromagnetic material that can be attracted by one or more of the magnets 390-1, 390-2, 390-3 and 390-4. As an example, the mobile device 400 may be positioned on the computing device 200 with a magnetic guiding force such that one or more interfaces can be aligned. For example, consider alignment of one or more of the wireless interface 395 and the wired interface 399 as shown in the example of FIG. 3. In such an example, power and/or data may be transmitted uni-directionally or bi-directionally. For example, the mobile device 400 may receive power and/or data from the computing device 200 or vice versa.

In the example of FIG. 4, the computing device 200 can be a notebook computing device with a clamshell form factor (e.g., the housing 202 as a base housing and the housing 304 as a display housing, coupled by the one or more hinge assemblies 326) and the mobile device 400 can be a tablet computing device that includes a housing 420 and a display 440. As an example, the mobile device 400 can include one or more features of the computing device 100 and/or the computing device 200 (see also, e.g., FIG. 9). For example, the mobile device 400 can include a processor, memory, one or more interfaces and a power source (e.g., a battery). As an example, the mobile device 400 can include one or more motion sensors such as, for example, an accelerometer, a gyroscope, etc. (see, e.g., the orientation sensor 357 of FIG. 3).

As shown in FIG. 4, each of the two devices 200 and 400 can be defined using a Cartesian coordinate system such that the computing device 200 has a width $\Delta x$ and a depth $\Delta y$ that define a plane and an area or footprint and such that the mobile device 400 has a width $\Delta xt$ and a depth $\Delta yt$ that define a plane and an area or a footprint. As shown, the area or footprint of the computing device 200 exceeds that of the mobile device 400 such that the mobile device 400 does not overhang the computing device 200. As an example, a mobile device may have an area or a footprint that is less than or equal to that of a computing device to which the mobile device can be coupled (e.g., attached via magnetic force, etc.).

Figure 5:
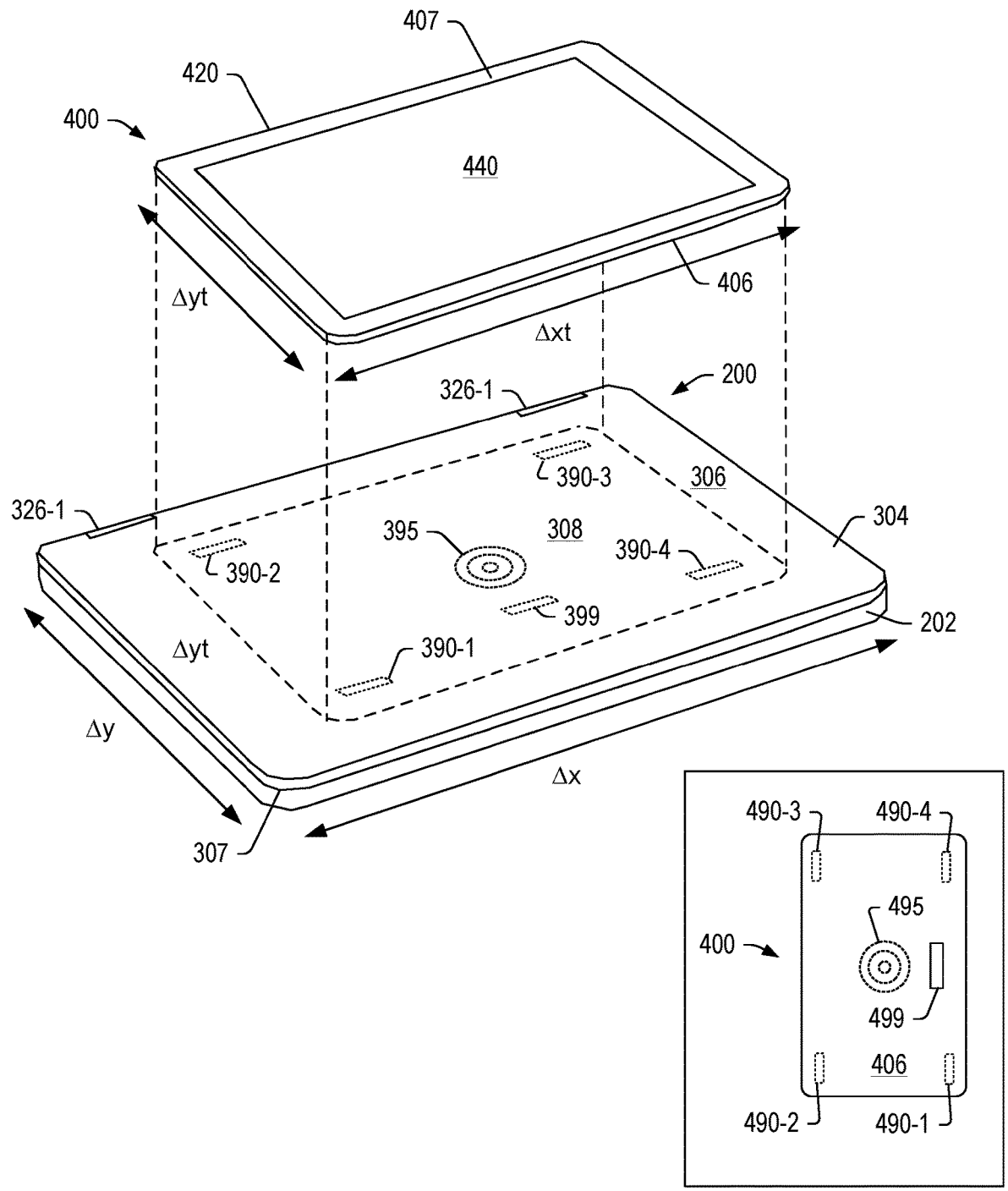
FIG. 5 is a diagram of the example of FIG. 4 prior to coupling.

FIG. 5 shows an example of the computing device 200 with the mobile device 400 prior to coupling of the mobile device 400 to the computing device 200. As shown, the computing device 200 can include the one or more hinge assemblies 326-1 and 326-2 (e.g., left side and right side hinge assemblies, a central single hinge assembly and/or another type of hinge assembly) that couple the housing 304 to the housing 202 where the housing 304 includes a back side 306 that includes a back side mobile device docking surface 308 and where the housing 304 includes a display side 307, which may be referred to as a front side of the housing 304, which is, in the closed clamshell position of the computing device 200, facing a top side of the housing 202 (e.g., facing the keyboard bezel assembly with the keyboard 214). In such an example, the back side mobile device docking surface 308 can be defined by one or more features of the computing device 200 such as, for example, one or more of the magnets 390-1, 390-2, 390-3 and 390-4, which as mentioned may provide for guiding position of the mobile device 400 upon coupling the mobile device 400 to the computing device 200 via the back side mobile device docking surface 308. For example, once the devices 200 and 400 are within a distance of each other where magnetic attraction force is experienced, the device 400 may be pulled into position on the back side mobile device docking surface 308 such that alignment is proper for interactions between the devices 200 and 400.

In the example of FIG. 5, a back side view of the mobile device 400 is also shown where the mobile device 400 can include a back side 406, a display side 407, one or more regions of ferromagnetic material 490-1, 490-2, 490-3 and 490-4 and one or more interfaces 495 and 499, which can be or include one or more of a wireless interface and a wired interface. As an example, one or more regions of ferromagnetic material 490-1, 490-2, 490-3 and 490-4 can include iron, which may be in the form of a permanent magnetic material or as a material that can be attracted to a permanent magnet. As an example, the mobile device 400 may include one or more shields to shield circuitry from electric and/or magnetic fields.

As an example, one or more of the computing device 200 and the mobile device 400 can include an electric field sensor and/or a magnetic field sensor. As an example, a wireless interface according to the Qi standard may provide for field sensing (e.g., consider sensing via alignment and/or misalignment of fields of antennas). As an example, a sensor such as a Hall effect sensor may be utilized, which can sense the presence of a magnetic field and, for example, magnetic field strength. As an example, a computing device and/or a mobile device can include one or more sensors that can provide for detection of coupling the mobile device to the computing device and/or decoupling of the mobile device from the computing device. Such detection can provide for issuance of one or more signals that can control one or more of firmware, an operating system, and an application that executes in an operating system environment.

As an example, a computing device may be a primary device of a user such as, for example, a work device that the user utilizes for work tasks. In such an example, the computing device may include information as to a schedule such as a calendar. As an example, the mobile device may be a secondary device of a user that may or may not include various work related information such as, for example, a calendar. As an example, a computing device and a mobile device may link electronically such that various types of information may be shared. As an example, a mobile device physically coupled to a computing device may be utilized for input and/or output for the computing device. For example, consider accessing a calendar of the computing device and rendering a graphical user interface of the calendar to a display of the mobile device where the calendar can be controlled via touch input via a touch display of the mobile device.

As an example, a system can include a processor; memory accessible to the processor; a base housing; a display housing that includes a display operatively coupled to the processor, a display side, and a back side that that includes a back side mobile device docking surface; a hinge assembly that couples the display housing and the base housing; and mobile device control circuitry that, responsive to docking of a mobile device to the back side mobile device docking surface, issues a mobile device operational control command. For example, consider a mobile device operational control command that provides for rendering information stored in the memory to a display of a mobile device docked to the back side mobile device docking surface of the display housing.

As an example, depending on rectangular dimensions of a mobile device with respect to rectangular dimensions of a computing device, a mobile device may be oriented in a landscape or a portrait position with respect to the computing device. For example, magnetic attraction features may be arranged such that a mobile device can be coupled to a back side of a display housing in one of two different orientations where, for example, interfaces may be aligned (e.g., wired and/or wireless interfaces). As an example, a mobile device may have a rectangular shape where its longest dimension is less than or equal to the shortest dimension of a rectangular display housing of another device (e.g., a clamshell computing device). In such an example, whether the rectangular shapes are mated along long and short dimensions or long to short and short to long dimensions, the mobile device may be coupled without extending beyond the boundaries of the rectangular display housing.

As an example, circuitry may provide for detecting whether the position is landscape or portrait. For example, consider utilizing one or more accelerometers, gyroscopes, magnetic field sensors, antennas, etc., to provide for such detecting. In such an example, a mobile device may suitably render information depending position and scenario (see, e.g., example scenarios of FIG. 6 and FIG. 7).

Figure 6:
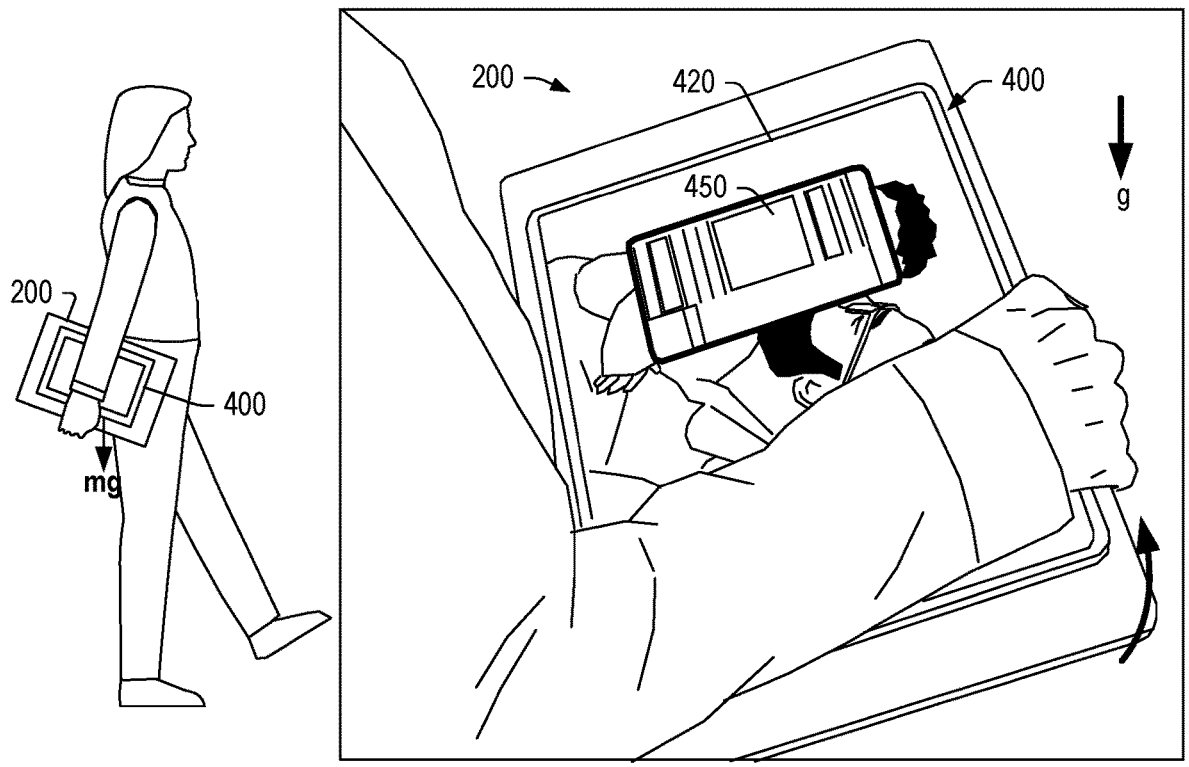
FIG. 6 is a series of diagrams of an example scenario and a block diagram of an example of a method.
Figure 6:
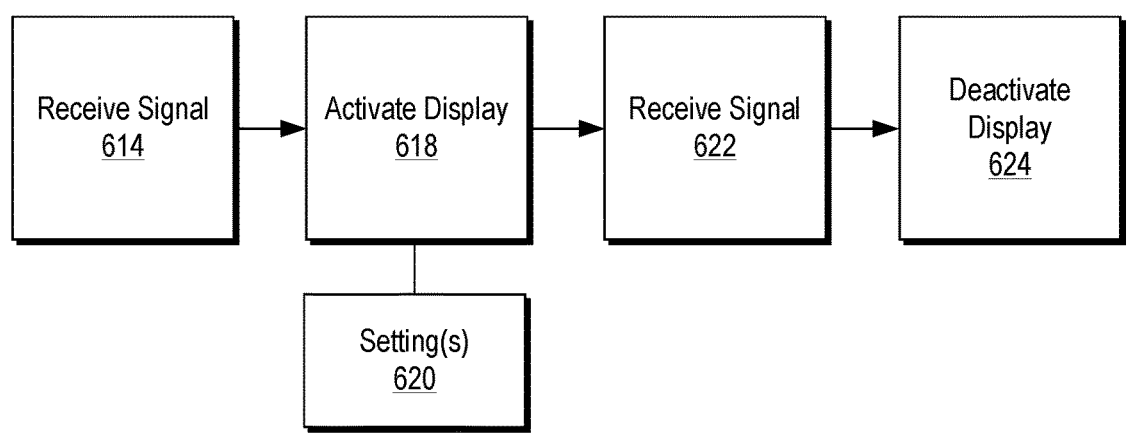

FIG. 6 shows an example of the computing device 200 (e.g., a computing system) where the mobile device 400 is coupled to the computing device 200 such that the two devices 200 and 400 can be transported as a unit. For example, a user may carry both of the devices 200 and 400, as coupled together, from a desk to a meeting room, from work to home, to a coffee shop, to a hoteling space, to a plane, etc. As shown in the example of FIG. 6, the mobile device 400 can provide for rendering of one or more GUIs 450 to the display 420. In such an example, rendering may occur responsive to a motion or motions, which may define one or more gestures. As explained, the computing device 200 and/or the mobile device 400 can include one or more motion sensors, which may be suitably used for motion detection and gesture discernment.

In the example of FIG. 6, a direction of gravity, g, is shown via an arrow. Consider a scenario where a user is in transit and carrying the two device 200 and 400 as coupled together in a generally vertical direction such that an x,y-plane of each of the two devices 200 and 400 is substantially aligned with gravity. In such a scenario, when the user wants to check a calendar or other information (e.g., an email, etc.), the user may tilt the two devices 200 and 400, as coupled together, such that the direction of the x,y-planes of the two devices 200 and 400 becomes more horizontal. In such an example, gravity is now in a more normal direction to the x,y-planes of the two devices 200 and 400. In such an example, a sensor or sensors can detect the change in position and issue a signal such as a rendering signal that causes rendering of the GUI 450 to the display 420 of the mobile device 400. As an example, response to motion or a change in position can be set via an application. For example, consider an application that allows for determining what is rendered when a change in position occurs from a substantially vertical position to a substantially horizontal position of a computing device and a mobile device coupled together.

In FIG. 6, an example method 610 is also shown, which includes a reception block 614 for receiving a signal, an activation block 618 for activating a display of a mobile device, which may be according to one or more settings per a setting(s) block 620, another reception block 622 for receiving another signal and a deactivation block 624 for deactivating the display of the mobile device. For example, the method 610 can cause activation and rendering to the display 420 of the mobile device 400 responsive to one motion signal related to position of the mobile device 400 and can cause deactivation of the display 420 response to another motion signal related to position of the mobile device 400. Such a method may be enabled upon coupling of the mobile device 400 to the computing device 200, which may be controlled, for example, via one or more settings. As an example, a setting can be a public space setting or a private space setting. For example, consider a public space setting that prohibits screen activation and/or that limits what may be rendered such that sensitive information does not become visible in a public space; whereas, a private space setting may provide for rendering of more information including sensitive information (e.g., within a work environment, etc.).

In various scenarios, a user may couple a mobile device to a computing device while leaving the coupled devices on a table, a desktop, etc. In such an example, being horizontal alone may not trigger display activation of the mobile device. For example, a user may have to contact a home button, a power button, etc., to activate the display. In various other scenarios, however, where a substantially horizontal position is immediately preceded by a substantially vertical position, then the transition can, depending on one or more settings, provide for display activation. As an example, an application may provide for setting logical sequences, which may form the basis of movement gestures that involve moving two computing devices as coupled together, for example, as in FIG. 6. In the example of FIG. 6, upon transitioning to a vertical position from the horizontal position, a signal may be generated that causes the display 420 of the mobile device 400 to go into a sleep mode. In such an approach, content rendered to the display 420 may be visible for a period of time as desired by the user and then not rendered such that the risk of others viewing the content may be reduced or eliminated when in the vertical position (e.g., as the user continues to walk to a destination, etc.). As explained, a timer setting may be available where a user can set a timer such as a 10 second timer that is utilized when no input is received via the display 420 of the mobile device 400. As explained, a setting can include a touch disable and/or a touch enable setting for the display 420. For example, a user may want to have touch disabled when the mobile device 400 is being transported on the computing device 200, regardless of orientation. However, a sequence of movements may override such that the display 420 does accept touch input.

As explained, display activation may be enabled upon a transition in position that also commences a timer. For example, consider a timer of approximately 30 seconds. In such an example, if 30 seconds is not a sufficient amount of time for the user, then the user may repeat a transition, for example, from horizontal to vertical and back to horizontal to gain an additional 30 seconds of display time. As an example, a gesture that involves two successive transitions within 5 seconds may trigger a "stay on" mode where a timer is disabled or otherwise extended beyond that of a basic timer (e.g., consider a 30 second timer versus a 10 minute timer).

As another example, a setting may control touch input for a particular region and negate touch input from one or more other regions. For example, consider the GUI 450 as being rendered to a particular region of the display 420 where a setting provides for touch input for the GUI 450 while disabling or rejecting input from other regions. In such an approach, a user may interact with the GUI 450 while still having a forearm in contact with the display 420 while the forearm contact is either not sensed or rejected. As an example, a setting may provide for entry of parameters, selection of parameters, etc., for one or more apps, GUIs, etc., such that a particular region of the display 420 is touch-enabled for interactions, which may include one or more interactions that bridge to the computing device 200 (e.g., to access memory, one or more applications, etc.). In the example method 610 of FIG. 6, one or more types of settings may be accessed per the setting(s) block 620. Such settings may provide a user to tailor behavior of at least the mobile device 400 for purposes of ease of use, security, ignoring extraneous unintended input (e.g., touches), etc.

As explained, the computing device 200 and/or the mobile device 400 can include gesture circuitry that provides for control of the two devices 200 and 400 when coupled together. The setting(s) block 620 may provide for gesture control such as programming movement/orientation sequences and/or assigning sequences to one or more actions.

As explained, transporting multiple devices, especially larger, screen-based devices such as laptops and tablets, can be difficult, risky, and often renders the devices useless when moved around. As explained, an A-cover, the back side shell of a display housing of a laptop computing device can be a functional space for coupling of a secondary device such that the secondary device is attached for transport safely, while allowing a user to view content on-the-go and optionally interacting with the secondary device and/or the laptop computing device (e.g., via the secondary device).

As explained, when a user moves from space to space with multiple devices, a computing device and a mobile device can include features that provide for stacking one on the other with sufficient coupling force to allow for carrying both of them, as stacked together, under one arm. Such an approach reduces risk of one of the devices falling or of the devices scratching one or the other. As an example, carry modes can include a display up position mode and a display down position mode for a mobile device with respect to a back side of a display housing of a computing device, where the display down mode may be a secure mode where a display of the mobile device is protected and where activation does not occur responsive to a change in position when the display is face down and not viewable.

As explained, an A-cover of a laptop computing device can be used as a surface to attach a secondary device, such as a tablet or a phone. When attached, the secondary device can provide, for example, a "quick-view" mode based on a certain gesture or movement (e.g., when the two devices, as coupled together, are tipped up towards a user).

As explained, various features can provide for physically attaching a secondary device (such as tablet or a smartphone) to laptop computing device A-cover. As explained, one or more magnets may be utilized, which can provide sufficient force to be robust enough to hold the secondary device onto the laptop computing device even when tipped on its side and jostled during transport. For example, using the equation $F=mg$, the mass of a mobile device may be taken in account together with a safety factor, which may be 100 percent of the mass of the mobile device. In such an approach, the force to couple the mobile device to a notebook computing device can be sufficient to overcome the gravity related force and additional force that may be experienced when a user is walking. During walking, an individual decelerates vertically as a heel hits the ground. For some individuals, a device held in a hand may be swung like a pendulum where the device is at a top of a front swing or at a top of a back swing when a left heel or a right heel hits the ground. Such swinging, which may be "natural" for some individuals, where a heel hit and bottom of a swing do not coincide, can help to reduce risk of a mobile device decoupling from a computing device during walking.

As explained, one or more types of interfaces may be utilized for power and/or data between a primary device and a secondary device (e.g., wireless and/or wired, such as UWB, NFC, BLUETOOTH, pogo pins, etc.). As explained, various types of circuitry, including one or more sensors, can provide for switching a secondary device into a "quick view" mode. In such an example, a quick view mode may, depending on setting(s), enable touch input to provide for touch input or may disable touch input such that touching is ignored. As an example, a gesture may be utilized to control rendering and/or touch input (e.g., touch circuitry of a touch sensitive display). As explained, a gesture can include a tip up gesture, where tipping upwardly to a more horizontal position during transport can trigger a secondary device to render information relevant to a user (e.g., calendar, time, weather, etc.).

Figure 7:
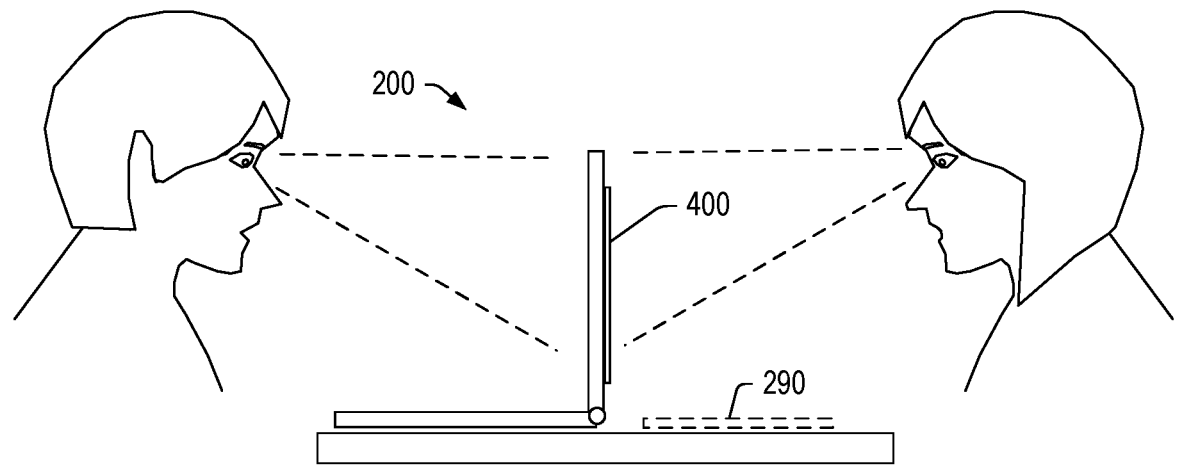
FIG. 7 is a diagram of an example scenario.
Figure 7:
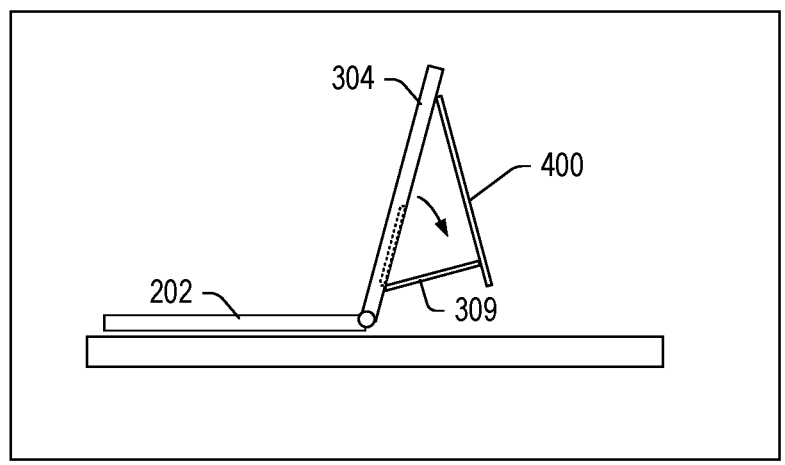

FIG. 7 shows an example scenario where two individuals are opposite each other with respect to a desktop or tabletop with the computing device 200 in front of one of the individuals and with the mobile device 400 in front of the other individual. As shown via dashed lines, an accessory keyboard 290 and/or another accessory input device may be provided. In the example of FIG. 7, the scenario can be referred to as a battleship mode where the computing device 200 is a clamshell device that is open and the mobile device 400 is attached to the housing 304 and where circuitry can provide for rendering content to the display 440 of the mobile device 400. In such an example, one or more controls, settings, etc., may provide for determining what is rendered to the display 440 of the mobile device 400 (e.g., name, contact information, photos, video, etc.).

FIG. 7 also shows an example where a bridge 309 can extend out of the housing 304, for example, to support the mobile device 400 at a desired angle. For example, if the individual to the left tilts back the housing 304 past 90 degrees with respect to the housing 202, that will reduce the angle of the mobile device 400 for the other individual. To compensate, the bridge 309 may be extended to support the mobile device 400 at a suitable angle. For example, the housing 304 can include a recess that can seat the deployable bridge. In such an approach, an end of the bridge 309 can include a magnet such that magnetic attraction force is retained, noting that contact can still occur between the mobile device 400 and the housing 304 where one or more magnets can provide for an attraction force. Additionally, when the mobile device 400 is an angle with respect to the housing 304, the gravity related force can be decreased compared to the gravity related force when the housing 304 is at 90 degrees (e.g., aligned with gravity); noting that the bridge 309, where present, may be utilized when the housing 304 is at 90 degrees.

Figure 8:
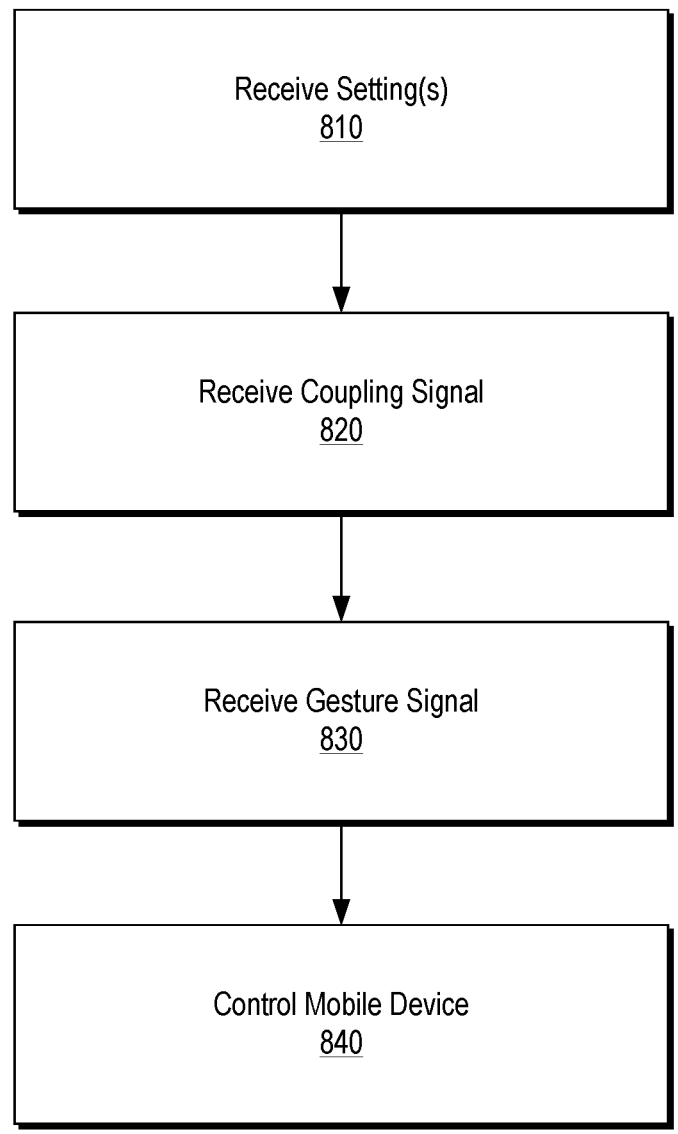
FIG. 8 is a block diagram of an example of a method.

FIG. 8 shows an example of a method 800 that includes a reception block 810 for receiving one or more settings; a reception block 820 for receiving a coupling signal indicative of coupling of a mobile device to a back side mobile device docking surface of a computing device; a reception block 830 for receiving a gesture signal; and a control block 840 for controlling the mobile device responsive to the gesture signal, which can include controlling according to at least one of the one or more settings. In such an example, a gesture signal may be for an opening gesture of a display housing with respect to a base housing, where a mobile device is coupled to the display housing, to provide for a scenario as in the example of FIG. 7 or a gesture signal may be for a tipping or tilting gesture of a computing device that is coupled to a mobile device where the computing device is closed (e.g., in a closed clamshell position) to provide for a scenario as in the example of FIG. 6.

As an example, a system can include a processor; memory accessible to the processor; a base housing; a display housing that includes a display operatively coupled to the processor, a display side, and a back side that includes a back side mobile device docking surface; a hinge assembly that couples the display housing and the base housing; and mobile device control circuitry that, responsive to docking of a mobile device to the back side mobile device docking surface, issues a mobile device operational control command. In such an example, the mobile device operational control command can enable gesture control of the mobile device. For example, consider a gesture control that includes a positional gesture based on the position of the display housing with respect to gravity. In such an example, the positional gesture can be a sensor-based gesture generated by at least one sensor where, for example, the at least one sensor may be a sensor carried by the display housing or the base housing. As an example, gesture control can include a positional gesture that controls rendering of at least one graphic to a mobile device display of a mobile device. In such an example, the at least one graphic can include a time-based graphic where, for example, time control may be according to a setting, a gesture, etc.

As an example, a display housing can include at least one magnet for docking of a mobile device.

As an example, mobile device control circuitry can detect an orientation of a mobile device on a back side mobile device docking surface of another computing device. In such an example, the orientation can be a mobile device display side facing the back side mobile device docking surface or the orientation can be a mobile device back side facing the back side of the mobile device docking surface.

As an example, an orientation can account for an orientation of the back side mobile device docking surface with respect to the base housing. For example, consider a display housing and a base housing that are in a closed clamshell orientation or, for example, in an open clamshell orientation. As an example, circuitry may be enabled for a closed clamshell orientation that infers that a clamshell device is closed and ready for transport (e.g., being carried by a user).

As an example, mobile device control circuitry can control rendering of content to a mobile device display of a mobile device responsive to execution of an application by a processor when the mobile device is coupled to a clamshell device where the clamshell device is open (e.g., with its display viewable). In such an example, the mobile device control circuitry can control rendering to replicate content rendered to the display of the display housing (see, e.g., FIG. 7).

As an example, a system can include an adjustable bridge deployable from a back side of a display housing for angling a mobile device with respect to the back side of the display housing. (see, e.g., FIG. 7).

As an example, a system can include an interface operatively coupled to mobile device control circuitry. As an example, an interface can be or include a wireless communication interface. As an example, a system can include a wireless power interface operatively coupled to mobile device control circuitry.

As an example, a system can include a mobile device where, for example, the mobile device is a mobile phone or a tablet computing device.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 9:
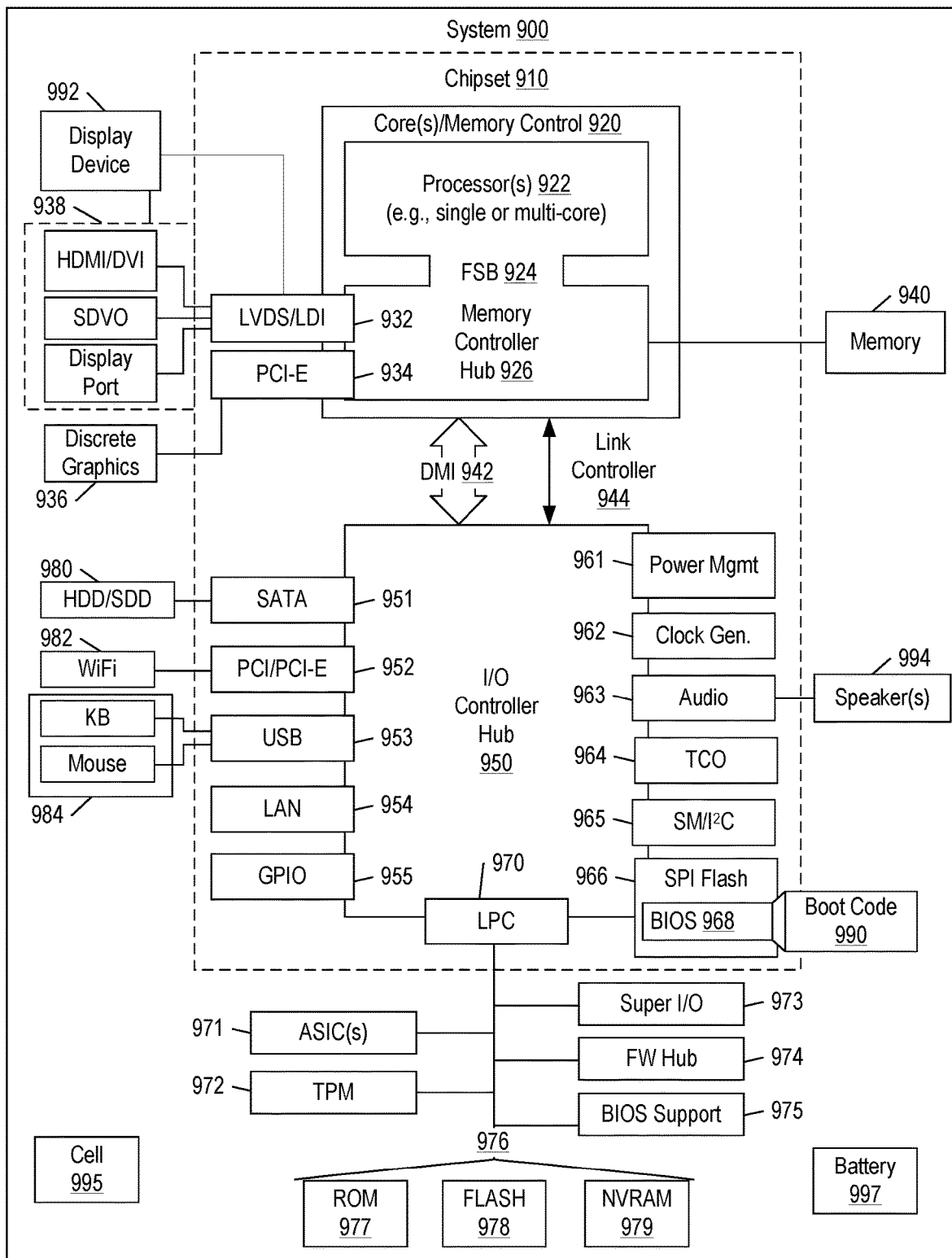
FIG. 9 is a diagram of an example of a system that includes one or more processors.

While various examples of circuits or circuitry have been discussed, FIG. 9 depicts a block diagram of an illustrative computer system 900. The system 900 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 900. As an example, a system such as the computing device 100 of FIG. 1, the computing device or system 200 of FIGS. 2, 3, 4, etc., may include at least some of the features of the system 900.

As shown in FIG. 9, the system 900 includes a so-called chipset 910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture.

The memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory".

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O hub controller 950 may include integrated gigabit Ethernet controller lines multiplexed with a PCI-E interface port. Other network features may operate independent of a PCI-E interface.

The interfaces of the I/O hub controller 950 provide for communication with various devices, networks, etc. For example, the SATA interface 951 provides for reading, writing or reading and writing information on one or more drives 980 such as HDDs, SDDs or a combination thereof. The I/O hub controller 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), one or more optical sensors, mice and various other devices (e.g., microphones, cameras, phones, storage, media players, etc.). On or more other types of sensors may optionally rely on the USB interface 953 or another interface (e.g., I²C, etc.). As to microphones, the system 900 of FIG. 9 may include hardware (e.g., audio card) appropriately configured for receipt of sound (e.g., user voice, ambient sound, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968. Again, as described herein, a satellite, a base, a server or other machine may include fewer or more features than shown in the system 900 of FIG. 9. Further, the system 900 of FIG. 9 is shown as optionally include cell phone circuitry 995, which may include GSM, CDMA, etc., types of circuitry configured for coordinated operation with one or more of the other features of the system 900. Also shown in FIG. 9 is battery circuitry 997, which may provide one or more battery, power, etc., associated features (e.g., optionally to instruct one or more other components of the system 900). As an example, a SMBus may be operable via a LPC (see, e.g., the LPC interface 970), via an I²C interface (see, e.g., the SM/I²C interface 965), etc.

Although examples of methods, devices, systems, etc., have been described in language specific to structural features and/or methodological acts, it is to be understood that the subject matter defined in the appended claims is not necessarily limited to the specific features or acts described.

Rather, the specific features and acts are disclosed as examples of forms of implementing the claimed methods, devices, systems, etc.

What is claimed is:

1. A system comprising:
a processor;
memory accessible to the processor;
a base housing;
a display housing that comprises a display operatively coupled to the processor, a display side, and a back side, opposite the display side, that comprises a back side mobile device docking surface;
a hinge assembly that couples the display housing and the base housing for transitioning the display housing and the base housing between a closed clamshell orientation and an open clamshell orientation; and
mobile device control circuitry that, responsive to docking of a mobile device to the back side mobile device docking surface of the display housing, enables, via the processor, gesture control of the mobile device, as docked to the back side mobile device docking surface of the display housing, wherein the gesture control comprises a positional gesture based on detection of a change in position of the display housing, in the closed clamshell orientation, with respect to gravity, wherein the change in position comprises a tilt of the base housing and the display housing in the closed clamshell orientation, with the mobile device docked to the back side mobile docking surface of the display housing, from a first position with respect to gravity to a second more horizontal position with respect to gravity, and wherein, based at least in part on the change in position, the mobile device control circuitry issues a signal for rendering to a mobile device display of the mobile device.

2. The system of claim 1, wherein the positional gesture is a sensor-based gesture generated by at least one sensor.

3. The system of claim 2, wherein the at least one sensor comprises a sensor carried by the display housing or the base housing.

4. The system of claim 1, wherein the positional gesture controls rendering of at least one graphic to the mobile device display of the mobile device responsive to the detection of the change in position, and wherein the change in position is to a substantially horizontal position.

5. The system of claim 4, wherein the at least one graphic comprises a time-based graphic.

6. The system of claim 1, wherein the display housing comprises at least one magnet for docking of the mobile device.

7. The system of claim 1, wherein the mobile device control circuitry detects an orientation of the mobile device on the back side mobile device docking surface.

8. The system of claim 7, wherein the orientation comprises a mobile device display side facing the back side mobile device docking surface or wherein the orientation comprises a mobile device back side facing the back side of the mobile device docking surface.

9. The system of claim 7, wherein the orientation comprises an orientation of the back side mobile device docking surface with respect to the base housing.

10. The system of claim 9, wherein the mobile device control circuitry controls rendering of content to the mobile device display of the mobile device responsive to execution of an application by the processor.

11. The system of claim 10, wherein the mobile device control circuitry controls the rendering to replicate content rendered to the display of the display housing.

12. The system of claim 1, comprising an adjustable bridge deployable from the back side of the display housing for angling the mobile device with respect to the back side of the display housing.

13. The system of claim 1, comprising an interface operatively coupled to the mobile device control circuitry.

14. The system of claim 1, wherein the interface comprises a wireless communication interface.

15. The system of claim 1, comprising a wireless power interface operatively coupled to the mobile device control circuitry.

16. The system of claim 1, comprising the mobile device.

17. The system of claim 16, wherein the mobile device is a mobile phone.

18. The system of claim 16, wherein the mobile device is a tablet computing device.

19. A system comprising:
a processor;
memory accessible to the processor;
a base housing;
a display housing that comprises a display operatively coupled to the processor, a display side, and a back side, opposite the display side, that comprises a back side mobile device docking surface;
a hinge assembly that couples the display housing and the base housing for transitioning the display housing and the base housing between a closed clamshell orientation and an open clamshell orientation; and
mobile device control circuitry that, responsive to docking of a mobile device to the back side mobile device docking surface, issues a mobile device operational control command, wherein, in the closed clamshell orientation, the mobile device control circuitry enables carry modes for transport of the system and the mobile device as a unit, wherein the carry modes comprise a display up position mode and a display down position mode for the mobile device with respect to the back side of the display housing, wherein the display down position mode is a secure mode wherein a mobile device display of the mobile device is protected and deactivated, wherein, in the display up position mode, the mobile device display of the mobile device is exposed and activable responsive to detection of a change in position of the display housing with respect to gravity, wherein the change in position comprises a tilt of the base housing and the display housing in the closed clamshell orientation, with the mobile device docked to the back side mobile docking surface of the display housing, from a first position with respect to gravity to a second more horizontal position with respect to gravity, and wherein, based at least in part on the change in position, the mobile device control circuitry issues a signal for rendering to the mobile device display of the mobile device.

20. The system of claim 19, comprising the mobile device.

* * * * *